United States Patent
De Graaf et al.

(10) Patent No.: US 6,837,292 B2
(45) Date of Patent: Jan. 4, 2005

(54) TIRE BUILDING DRUM PROVIDED WITH A TURN-UP DEVICE

(75) Inventors: Martin De Graaf, Kz Emst (NL); Heinz Gutknecht, At Epe (NL); Henk Huisman, Da Epe (NL); Wubbo Pieter De Vries, Nz Hoogeveen (NL)

(73) Assignee: VMI EPE Holland B.V., Rk Epe (NL)

( * ) Notice: Subject to any disclaimer, the term of this patent is extended or adjusted under 35 U.S.C. 154(b) by 124 days.

(21) Appl. No.: 10/241,799

(22) Filed: Sep. 11, 2002

(65) Prior Publication Data

US 2003/0034132 A1 Feb. 20, 2003

Related U.S. Application Data

(63) Continuation of application No. PCT/NL01/00219, filed on Mar. 16, 2001.

(30) Foreign Application Priority Data

Mar. 17, 2000 (NL) .............................................. 1014687

(51) Int. Cl.$^7$ ............................................... B29D 30/32
(52) U.S. Cl. ...................... 156/402; 156/414; 156/415; 156/416
(58) Field of Search ................................. 156/132, 402, 156/400, 403, 414, 415, 416, 417

(56) References Cited

U.S. PATENT DOCUMENTS

| 3,093,531 A | 6/1963 | Frohlich et al. ............. 156/400 |
| 3,173,821 A | 3/1965 | Trevaskis .................... 156/401 |
| 3,887,423 A * | 6/1975 | Gazuit ......................... 156/402 |
| 4,484,973 A | 11/1984 | Kawaida et al. ............. 156/400 |

FOREIGN PATENT DOCUMENTS

| FR | 1485919 | 9/1967 |
| GB | 1532960 | 11/1978 |
| GB | 2182894 | 5/1987 |
| WO | 9852740 | 11/1998 |

\* cited by examiner

Primary Examiner—Geoffrey L. Knable
(74) Attorney, Agent, or Firm—Ladas & Parry LLP (57) ABSTRACT

Tire drum (1) including a turn-up mechanism for use in building an unvulcanized tire having tire components of rubber or provided with reinforcement cords and two bead cores which either may or may not be provided with a bead filling strip, which tire drum is provided with a central axis (5), two ring segments (6) placed around the axis and spaced apart each for supporting a bead core (3), means for radially expanding the part of the tire components that is situated within the ring segments, in which the tire building drum on either side outside of the ring segments is provided with a set of radially extending hinging arms (11), in which each arm is provided with an end oriented towards the ring segment which end has a first turn-up means, such as a first roller (12), means (20) for axially and radially moving each set of arms from a first position in which the first rollers of the set of arms form a virtually closed ring into an expanded second position for pressing the part of the tire components situated outside of the ring segments against the expanded part of the tire components situated within the ring segments, in which the arms at the ends near the first rollers are provided with moveable support surfaces (15) which in the first position form a virtually closed cylindrical surface for supporting the tire components.

21 Claims, 6 Drawing Sheets

FIG. 3

TIRE BUILDING DRUM PROVIDED WITH A TURN-UP DEVICE

This application is a continuation of copending International Application PCT/NL01/00219 filed on 16 Mar. 2001, which designated the U.S., claims the benefit thereof and incorporates the same by reference.

FIELD OF THE INVENTION

The present invention relates to a tire drum including a turn-up mechanism for use in building an unvulcanized tire having tire components of rubber or provided with reinforcement cords and two bead cores which either may or may not be provided with a bead filling strip, which tire drum is provided with a central axis, two ring segments placed around the axis and spaced apart each for supporting a bead core, means for radially expanding the part of the tire components that is situated within the ring segments, in which the tire drum on either side outside of the ring segments is provided with a set of radially extending hinging arms, in which each arm is provided with an end oriented towards the ring segment which end has a first turn-up means, such as a first roller, means for axially and radially moving each set of arms from a first position in which the first rollers of the set of arms form a virtually closed ring into an expanded second position for pressing the part of the tire components situated outside of the ring segments against the expanded part of the tire components situated within the ring segments.

BACKGROUND

Such tire drums provided with a turn-up mechanism are generally known. They may be designed as tire building drum on which the tire components, in particular liner and carcass layers are supplied and of which a cylindrical casing is being made, and also bead cores are supplied, after which the cylindrical casing on the tire building drum is expanded into a curved torus shape, in which the sides of the casing are turned up about the bead cores by means of the turn-up mechanism. They may also be designed as a curving drum, to which an already formed cylindrical carcass casing has been supplied.

Such a tire building drum including turn-up mechanism is known from British patent specification 1.532.960. When building a tire, portions of the tire components end up on the arms. Because there is room between the arms, and the arms may leave imprints in the portions of the tire components, it has appeared that an accurate tire cannot be manufactured with said known building drum in all cases.

SUMMARY OF THE INVENTION

It is an object of the present invention to provide a tire drum including a turn-up mechanism having arms, with which tires can be manufactured in an accurate manner.

From one aspect the invention to that end provides a tire drum of the kind mentioned in the preamble, in which the arms at the ends near the first rollers are provided with moveable support surfaces which in the first position form a virtually closed cylindrical surface for supporting the tire components. Because in the first position the arms from a virtually closed cylindrical surface, an optimal surface is created to accurately arrange and splice the tire component in question, and after that the rolling during the movement of the arms to the expanded second position and back again can take place without trouble and the tire components can be rolled without air enclosures arising.

Preferably the support surfaces extend up to the end of the arm in question including roller. Also at the location of the roller a—removable—surface then may or may not be provided to the tire components when desired.

Preferably each support surface is arranged moveable in arm direction on the arm in question. In that way the arm may have a function in the support and guidance of the moveable support surface.

In a further development, the support surface can be moved in arm direction between a first position, in which the roller is covered radially to the outside, and a second, retracted position, in which the roller is uncovered in radial outward direction. In the second position the roller can offer an idle support to the tire components during turning-up.

Preferably each support surface is arranged moveable in radial direction on the arm in question between a third, radially expanded position and a fourth, with respect to the roller, radially retracted position. The support surfaces here pull themselves loose from the tire material they previously supported.

Preferably the first and the third position of the support surface coincide, and preferably the second and fourth position coincide, as a result of which the movements can be efficiently realised.

In a first further development the support surface is formed by a cover plate that can be moved on the arm. The construction of the arm may substantially be as usual, for instance thin and light, in which the cover plate is formed as an extra part with a support surface for the tire components.

Preferably the cover plates are provided with a drive member forming a unity with them, which drive member engages in an axially slidable drive for moving the cover plates, in which the drive member extends radially freely in a driving slide for movement along the arms in the first position of the arms, so that the movement of the arms can take place easily and without trouble.

Preferably the cover plate and the arm in question are provided with stops for limiting the relative movement, so that the functioning is always certain.

When the arms are brought into the extended position, the portion in question of the tire components slides over the arms. With certain kinds of rubber of which the tire components have been made, such sliding may cause unwanted friction, as a result of which the final quality of the tire built leaves something to be desired. According to the invention this is solved in that in a second further development each arm is provided with a second roller which is spaced apart from the said roller, and in which the support surface is formed by an endless belt, which has been placed about the first and second roller and in which the endless belts are situated adjacently in the first position of the arms to define an at least virtually closed circumferential surface. The—idle—belt can move along with the tire components during the turning-up process, so that the frictional forces can remain limited.

Preferably the second roller is biassed away from the first roller by means of a spring, in which the spring preferably is attached to the arm in question, so that the belt can always remain at tension.

Preferably the sets of hinging arms on either side outside of the ring segments can be moved synchronously by a mechanical coupling from the first to the second position.

BRIEF DESCRIPTION OF THE DRAWING

Some embodiments of a tire (building) drum including turn-up mechanism having arms according to the invention, are described below by way of example on the basis of the drawing, in which.

DETAILED DESCRIPTION

Figure 1A:
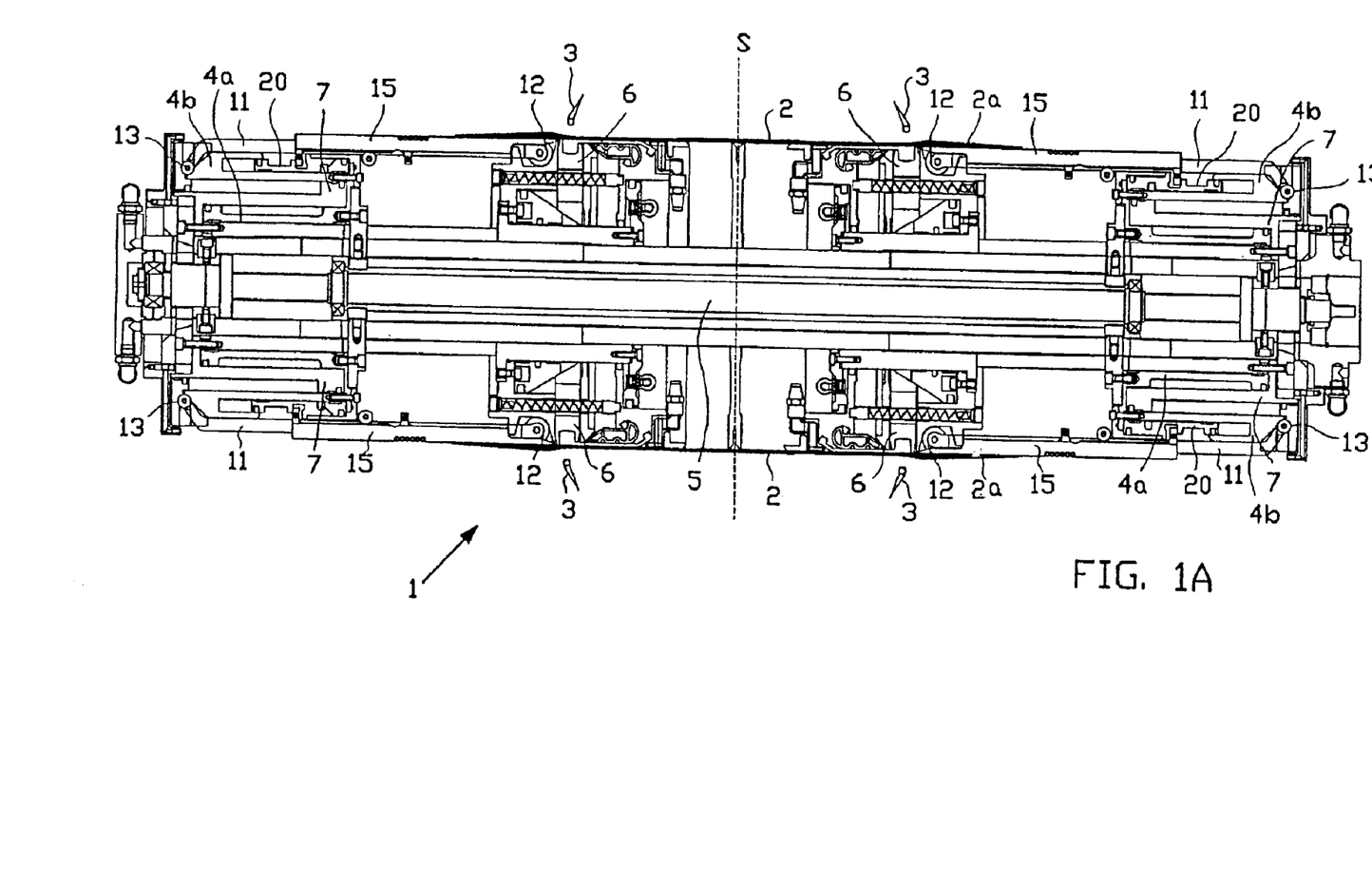
FIGS. 1A up to and including 1D schematically show a longitudinal section of a tire building drum including turn-up mechanism according to the invention for building an unvulcanized tire, in several process steps.

FIGS. 1A up to and including 1D schematically show a longitudinal section of a tire building drum 1 including turn-up mechanism according to the invention for building an unvulcanized (radial) tire, in several treatment steps. Such an unvulcanized tire contains tire components 2 of rubber, possibly provided with reinforcement cords, (in the stage shown in FIG. 1 the tire components used are: a so-called liner having two sides 2a and a carcass layer) and two bead cores 3 having—in this case—a high bead filling strip on it. The number and the type of tire components depend on the tire to be manufactured in the end, and the possible compositions and structure are sufficiently known to the expert, so that a further discussion of this can be dispensed with here.

Figure 1B:
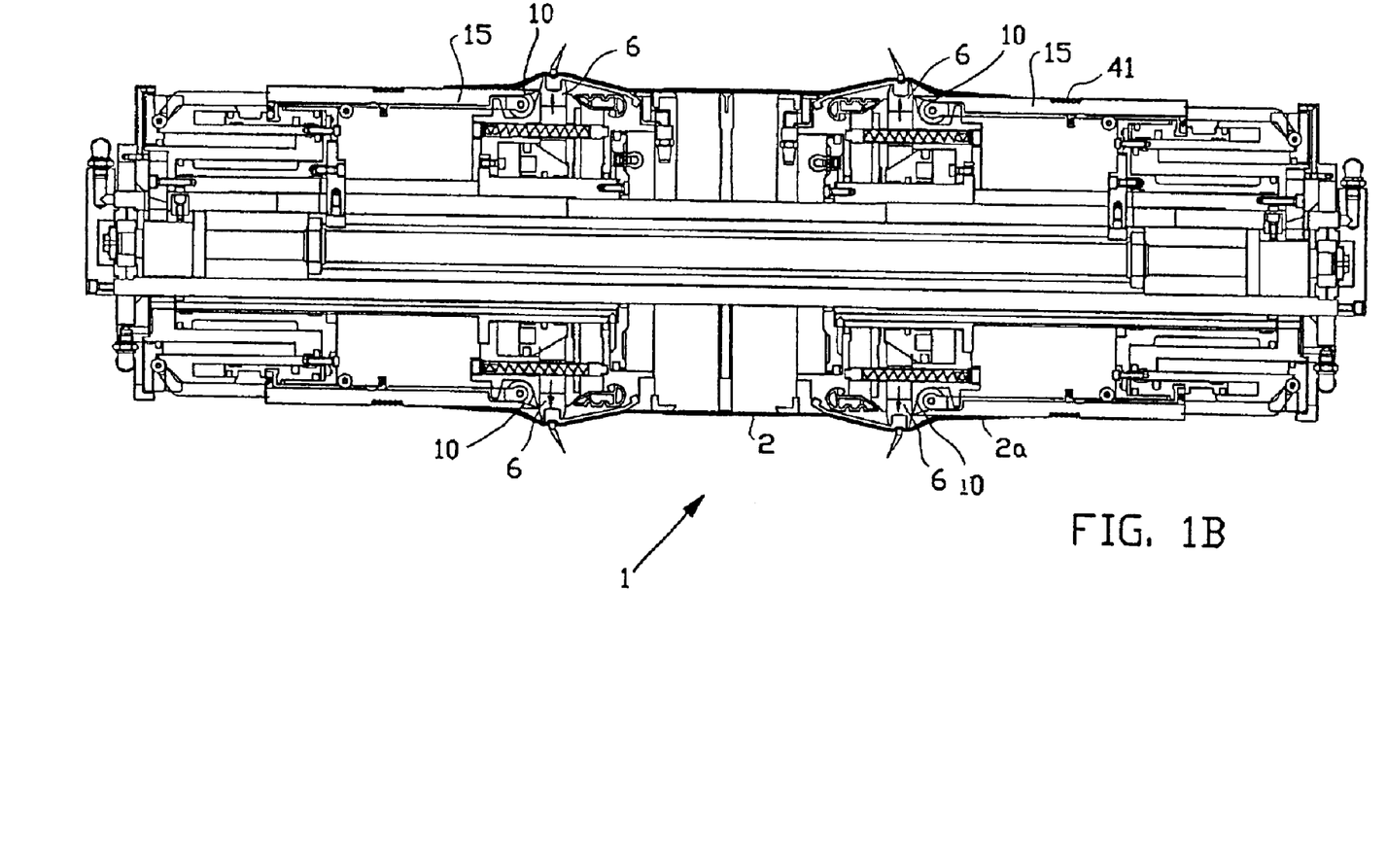
Figure 1C:
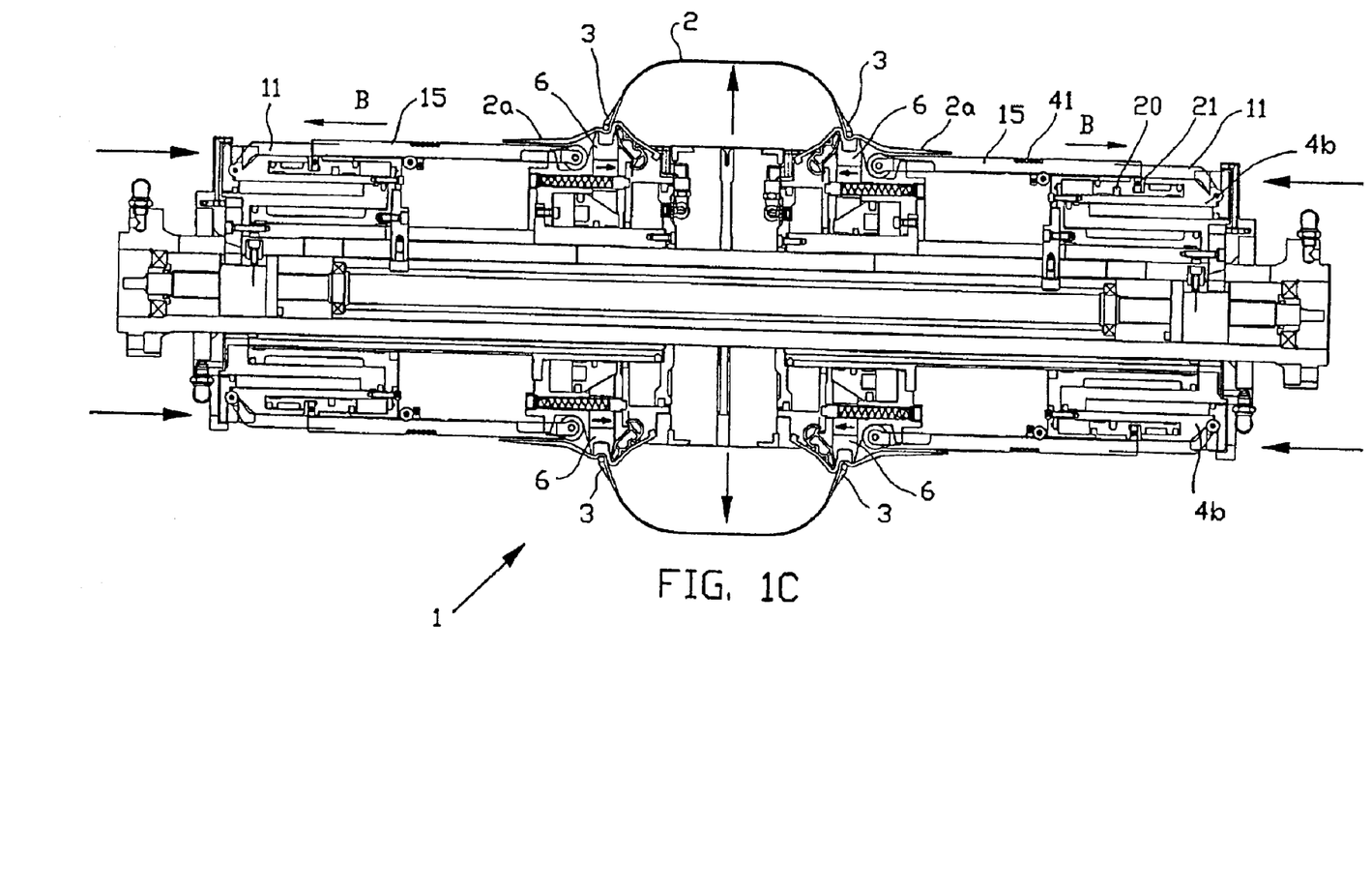
Figure 1D:
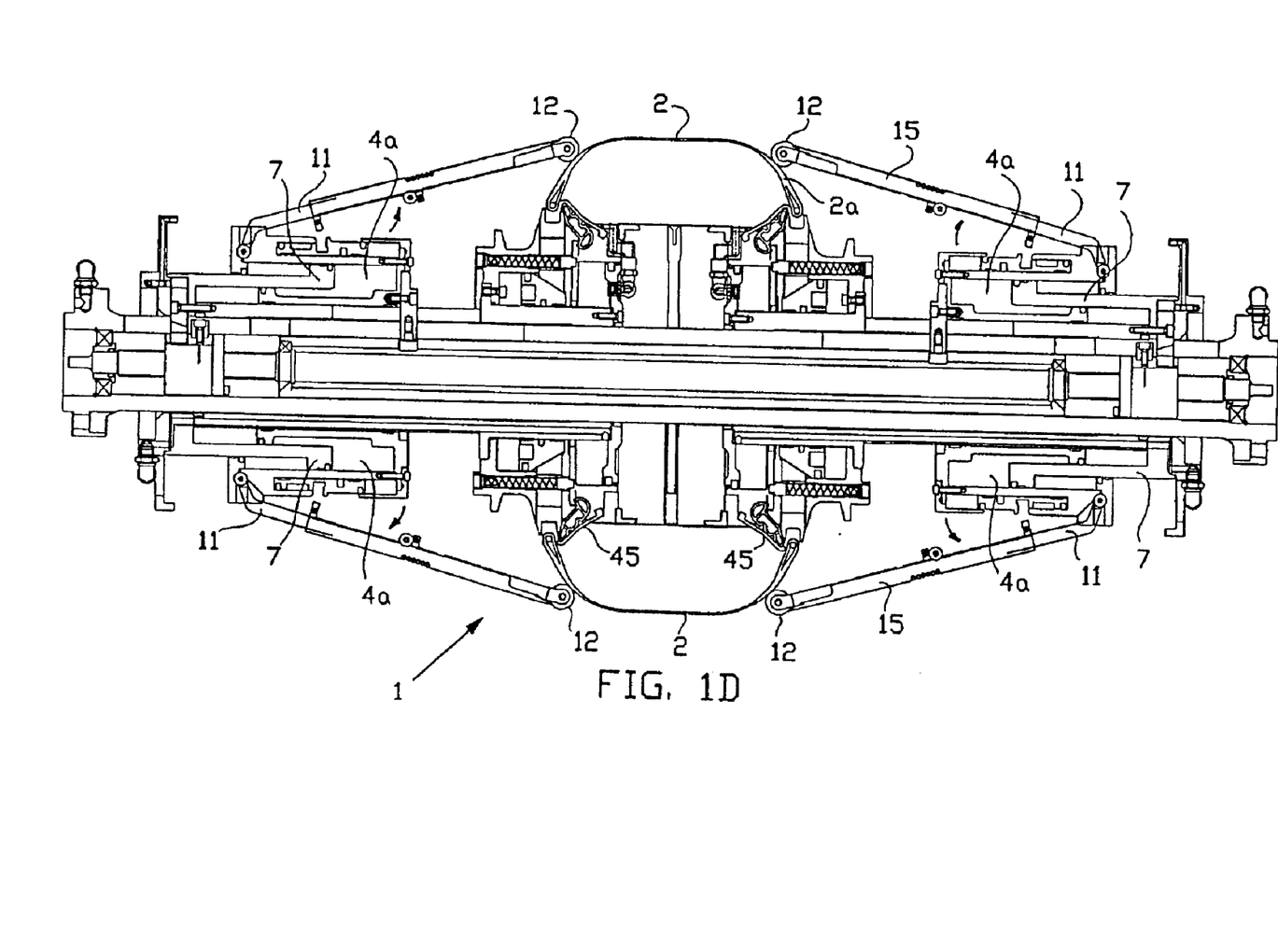

The tire building drum 1 is provided with a central shaft 5. About the shaft 5 and at a distance from each other two annular bead clamping segments 6 have been placed, each for supporting accompanying bead cores 3 and provided with moveable inner supports 45, which prevent the carcass from being pressed from the annular segments 6 during formation (FIG. 1D).

FIG. 1 shows an example of a tire building drum. As is known, there are means (not shown in the figure) in this case for radially expanding the part of the tire components that is situated within the segments 6—for instance by means of air pressure—.

Two annular cylinders 4a have also been arranged—on both ends—about the shaft 5, in which cylinders 4a pistons 7 extend. At the location of hinge points 13 turn-up arms 11 are connected to the cylinders 4a, which turn-up arms at their other ends are provided with idle "first" turn-up and pressing roller 12. It will be understood that the tire building drum is substantially symmetrical, in which in the centre the surface of symmetry extends transverse to the shaft 5.

Figure 2A:
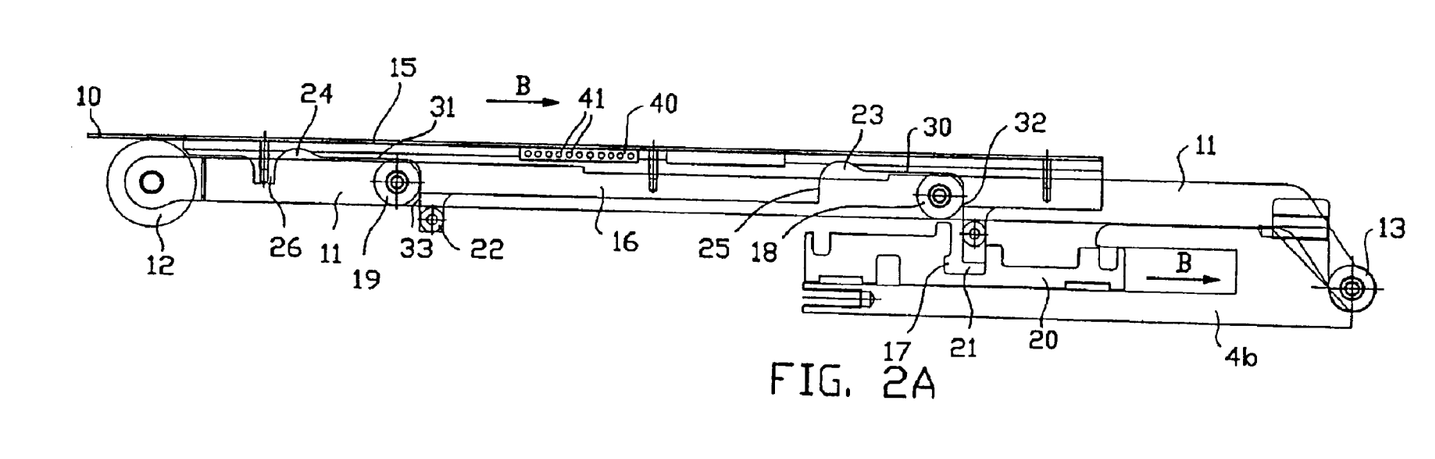
FIGS. 2A and 2B show two positions of a support surface on an arm in the tire building drum of the FIGS. 1A–1D.
Figure 2B:
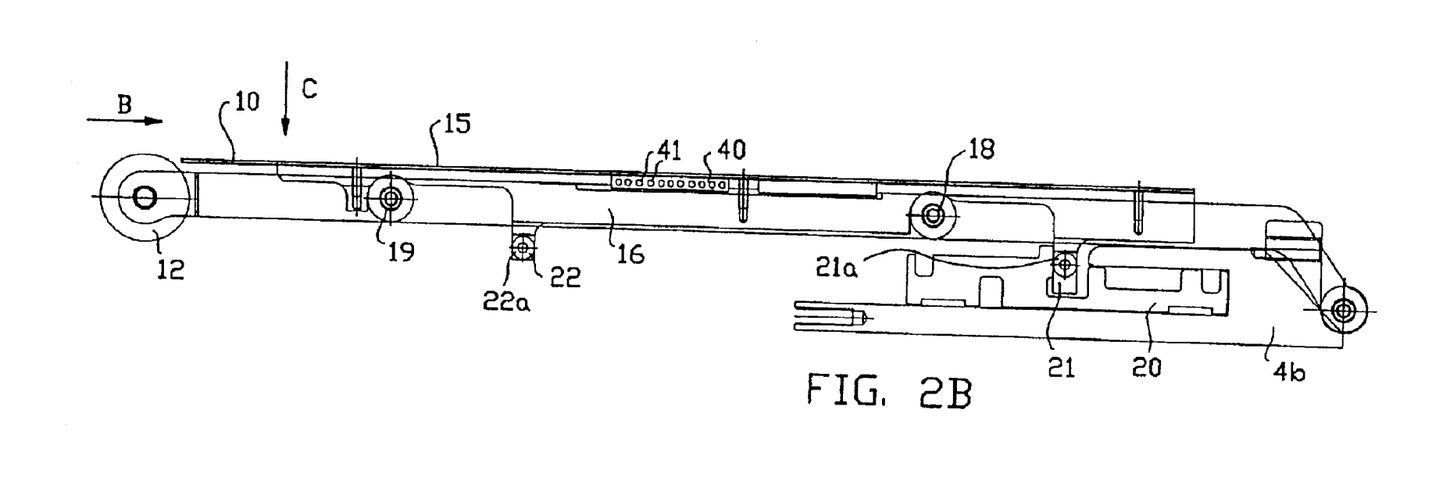

In the FIGS. 2A and 2B the structure of the arms 11 is further illustrated. The arms 11 are elongated and together with the roller 12 serve to turn up the tire components against the expanded carcass. The arm 11 here is furthermore provided with an elongated cover plate 15 placed over the arm 11, which cover plate forms a support surface 10 at the end. At the other end the cover plate 15 is provided with a driving cam 21, which extends into a recess 17 of a piston 20, which extends into the cylinder 4b which forms a moveable unity with the above-mentioned cylinder 4a, but which is axially and oppositely oriented. On the longitudinal sides the arm 11 is provided with support rollers 18 and 19 for the cover plate 15, which rests on them with edges 30 and 31, which in the direction towards the roller 12 merge into an elevated edge portion 23 and 24, respectively. Said portions merge into stop edges 25 and 26, respectively, which with opposite stop edges 32 and 33 define the axial movement space for the rollers 18 and 19 (relatively considered). The cover plate 15 is locked against lifting too far (further than the position shown in FIG. 2A) with respect to the arm 11 by transverse pin 22a attached to the pending side walls 16 of the cover plate 15, in particular pending lips 22, which pin 22a extends under the arm 11. A comparable confining pin 21a is arranged on driving cam 21.

Furthermore, elongated recesses 40 have been made in the side walls 16, through which recesses tension springs 41 extend, which extend circumferentially about the drum 1 and serve to urge the arms 11 into the resting position in a resilient manner, in a manner known per se. The draw springs 41, because they are secured to the cover plate 15, also exert a downward force directed towards the arm 11 on the cover plate 15.

As can be seen when comparing the FIGS. 2A and 2B, the movement of the piston 20 in the cylinder 7 in the direction B will carry along the cam 21, so that also the cover plate 15 is moved in the direction B, which direction is parallel to the arm 11 and to the axial main axis of the tire building drum. As a result the support surface 10 will move to the right, and finally entirely free the roller 12, so that during turning up its upper surface as well can be active in contact with tire components. After the end of the cover plate 15 has passed by the roller 12, the elevated edge portions 23 and 24 will also have ended up at the location of the rollers 18 and 19, so that the cover plate 15 is also able to go down in the direction C with respect to the arm 11. The position shown in FIG. 2B is then achieved. The cover plate 15 then is in the entirely retracted position. The roller 12 can then also extend radially above the support surface 10, so that the tire components come entirely loose from it and can roll along it during turning up.

Thus an at least virtually closed circumferential surface for supporting tire components can be obtained in the initial stage of building. In this way an optimal surface is created for accurately placing the tire components in question. By way of example for a circumferential surface formed by support surfaces in the resting position of approximately 15 inches, having two groups of forty-eight arms on each side of the plane of symmetry the movement distance in the direction B is 34 mm, and in the direction C 3 mm (so a difference in diameter of 6 mm), in case of an intermediate distance, considered in circumferential direction of the cover plates 15 in the position of the FIG. 2A of 0.2 mm, which makes the movement in direction C possible and still gives an effectively continuous circumferential surface for the tire components in the position of FIG. 2A. The width of the support surfaces here is 23 mm. In the position of FIG. 2B the cover plates 15 lie against each other in circumferential direction.

The position shown in FIG. 2A corresponds to the one of FIG. 1A, in which the tire components have been placed. The circumferential surface then has the largest diameter, with little slits of 0.2 mm between the support surfaces 10. The tire components 2, in the shape of a liner (inner liner) having two side walls 2a, are applied, and after that one or more cord layers (ply) and possible reinforcement strips. By means of a ply-splice stitcher roller that is moved in axial direction over the circumference the layers are spliced together, so that a cylindrical tire casing is created. The aforementioned little slits are too narrow to accommodate the pressed soft material of the liner.

Subsequently the bead clamping segments 6 are radially expanded, so that they extend radially above the support surface 10. They clamp the tire material around the bead core 3 in order to ensure an airtight clamping. The tire material 2a is loosened a little already from the support surfaces 10 at that location by the upward pressing. This is shown in FIG. 1B.

At that moment the piston/cylinder 20/4b can be operated, so that the cover plates 15 of all arms are simultaneously slid in the direction B and a little downward in the direction C. The circumferential surface then takes up its smallest diameter i, in which the cover plates with the support surfaces 10 define a slit-less circumferential surface of the drum. The tire material is then entirely and circumferentially pulled loose from the support surfaces. This stage is shown in FIG. 1C. In that way the rollers 12 come to lie completely free, in order to be completely effective during the subsequent turning up of the tire components and rolling them. The distance between the bead clamping segments 6 is reduced so that the distance between the beads 3 is also made smaller, and the internal bead supports 45 move upward. Because of the pressurized air supplied from the inside the cylindrical carcass casing starts to expand into a torus shape.

Immediately after that the turn-up mechanism is activated, in which the arms 11 amongst others by operating the piston/cylinders 7/4a, are axially moved towards each other (considered on either side of the surface of symmetry). With the rollers 12, they move radially to the outside as well, counter to the spring tension of the draw springs 41. The tire components 2a are here turned up about the bead 3 and against a side wall of the torus shaped carcass by the rollers 12. In the extremest position of the arms they are situated in the position shown in FIG. 1D. During the upward movement of the rollers 12 the sideward tire components are able to roll over them without trouble until in abutment against the side walls of the tire to be made.

It is noted that the movement of the cover plates 15 may possibly be controlled separately, or in another way mechanically coupled to the movement of another construction part of the building drum, for instance with the upward movement of the bead clamping segments, in particular the lateral inner shoulders 45 which support the bead cores 3 sideward.

Figure 3:
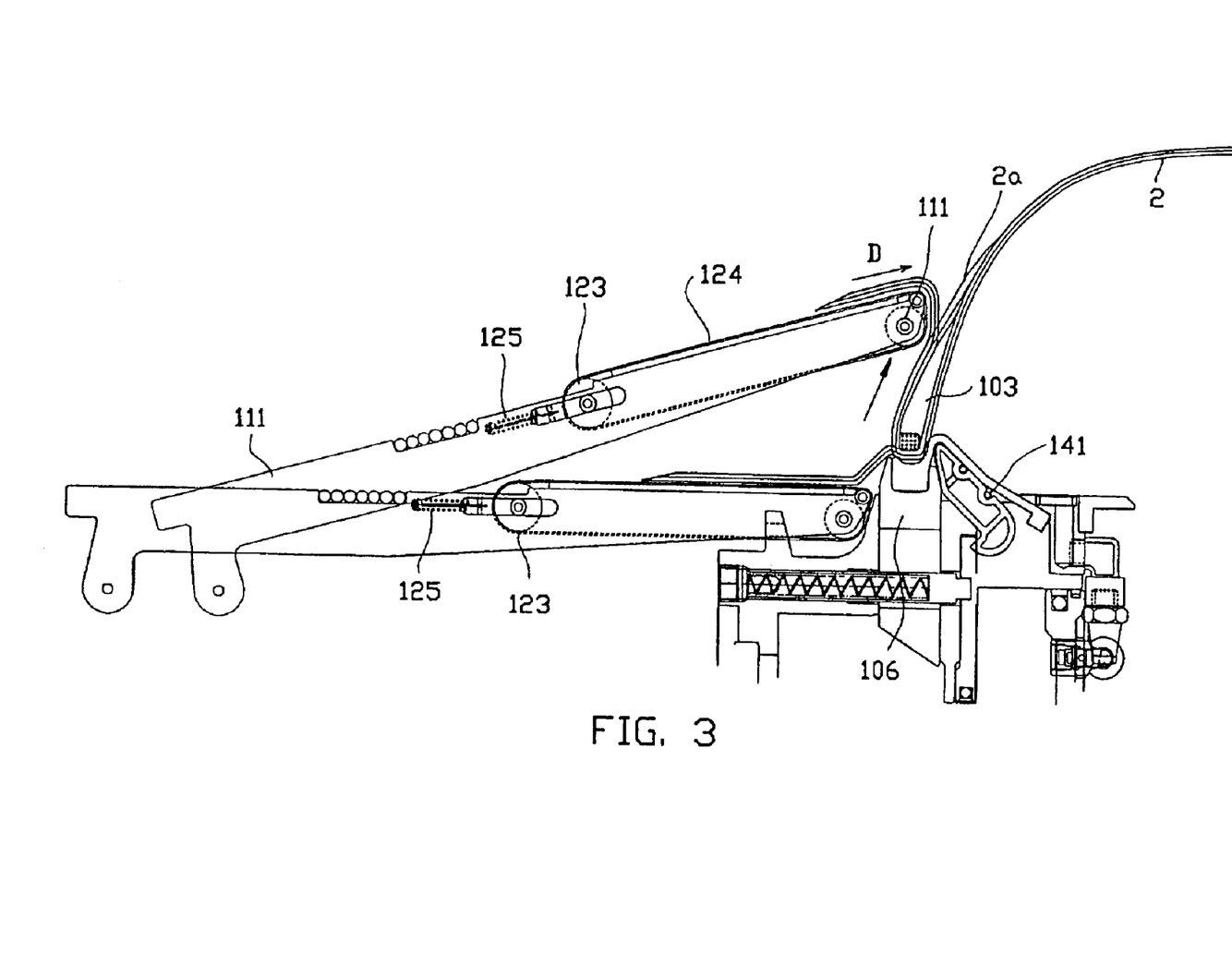
FIG. 3 shows an alternative embodiment according to the invention of a part of the tire building drum.

When the arms are brought into the second position, the portion in question of the tire components slides over the arms. In order to reduce this friction the alternative embodiment according to FIG. 3 is suggested. Here each arm 111 of the set of arms is provided with a second roller 123 which is placed at a distance from the first roller 112. An endless conveyor belt 124 has been placed around the first 112 and second 123 rollers. The endless conveyor belts 124 of the arms 111 are situated adjacent to each other in the first position (in FIG. 3 the horizontal position). During the movement of the arms from the first to the second position (in FIG. 3 the inclined position) the conveyor belt 124 moves along such with the rubber components A (indicated by arrow D) that at least almost no friction arises any more. As a result it is also prevented that unwanted stretch in the tire components arises.

In order to keep the conveyor belt 124 taut, the second roller 12 is suspended from the arm 111 by means of a spring 125.

What is claimed is:

1. Tire drum comprising a turn-up mechanism for use in building an unvulcanized tire having tire components of rubber or provided with reinforcement cords and two bead cores which either may or may not be provided with a bead filling strip, which tire drum is provided with a central axis, two ring segments placed around the axis and spaced apart each for supporting a bead core, means for radially expanding the part of the tire components that is situated between the ring segments, in which the tire drum on either side outside of the ring segments is provided with a set of axially extending hinged arms, in which each arm is provided with an end oriented towards the ring segment which end has a first turn-up roller, means for axially and radially moving each set of arms from a first position in which the first rollers of the set of arms form a virtually closed ring to an expanded second position for pressing a part of the tire components situated outside of the ring segments against the expanded part of the tire components situated between the ring segments, in which the arms extend in an arm direction and in which the arms at the ends near the first rollers are provided with support surfaces for supporting the tire components, said support surfaces being movable in the arm direction along the arm and in the first position form a virtually closed cylindrical surface for supporting the tire components and in the second position said support surfaces on said arms are spaced from one another in circumferential direction of the tire drum.

2. Tire drum according to claim 1, in which each support surface extends up to the first roller carrying end of the arm in question.

3. Tire drum according to claim 1, in which the support surface can be moved in arm direction.

4. Tire drum according to claim 3, in which each support surface can be moved in arm direction on the arm in question between a first position, in which the roller is covered radially to the outside, and a second, retracted position, in which the roller is uncovered in radial outward direction.

5. Tire drum according to claim 1, in which each support surface is arranged moveable in radial direction on the arm in question between a third, radially expanded position and a fourth, with respect to the roller, radially retracted position.

6. Tire drum according to claim 4, in which each support surface is arranged moveable in radial direction on the arm in question between a third, radially expanded position and a fourth, with respect to the roller, radially retracted position, in which the first and the third position of the support surface coincide.

7. Tire drum according to claim 4, in which each support surface is arranged moveable in radial direction on the arm in question between a third, radially expanded position and a fourth, with respect to the roller, radially retracted position, in which the second and fourth position coincide.

8. Tire drum according to claim 1, in which the support surface is formed by a cover plate that can be moved on the arm.

9. Tire drum according to claim 8, in which the cover plates are provided with a drive member integrated with the cover plate, in which said drive member engages in an axially slidable drive for moving the cover plates.

10. Tire drum according to claim 9, in which the drive member extends radially freely in a driving slide for movement along the arms in the first position of the arms.

11. Tire drum according to claim 8, in which the cover plate and the arm in question are provided with stops for limiting relative movement between the cover plate and the arm in question.

12. Tire drum according to claim 8, in which the arms are biassed towards the first position by means of a circumferential tensioning ring, and in which the tensioning ring is connected to the cover plates.

13. Tire drum according to claim 12, in which the tensioning ring directly engages the cover plate and the arm via the cover plate.

14. Tire drum according claim 1, in which each arm is provided with a second roller which is spaced from the first said roller, and in which the support surface is formed by an endless belt, which is placed about the first and second rollers and in which the endless belts are situated adjacently in the first position of the arms.

15. Tire drum according to claim 14, in which each support surface extends up to the end of the arm in question including roller.

16. Tire drum according to claim 14, in which the support surface can be moved in arm direction.

17. Tire drum according to claim 14, in which the second roller is biassed away from the first roller by means of a spring.

18. Tire drum according to claim 17, in which the spring is attached to the arm in question.

19. Tire drum according to claim 1, in which the sets of hinged arms are on either side outside of the ring segments and can be moved synchronously by a mechanical coupling from the first to the second position.

20. Tire drum according to claim 12, in which the tensioning ring extends to the cover plate.

21. Tire drum according to claim 1, in which each support surface can be moved in a direction away from the first roller carrying end of the arm in question when moving the arm from the first position to the second position.

* * * * *